United States Patent [19]

Strid

[11] Patent Number: 5,951,861
[45] Date of Patent: Sep. 14, 1999

[54] DEVICE FOR FILTRATION AND A METHOD FOR CONVERSION

[75] Inventor: Kent Strid, Järbo, Sweden

[73] Assignee: Kvaerner Pulping AS, Lier, Norway

[21] Appl. No.: 08/945,328

[22] PCT Filed: Jun. 3, 1996

[86] PCT No.: PCT/SE96/00732

§ 371 Date: Oct. 23, 1997

§ 102(e) Date: Oct. 23, 1997

[87] PCT Pub. No.: WO96/38214

PCT Pub. Date: Dec. 5, 1996

[30] Foreign Application Priority Data

Jun. 2, 1995 [SE] Sweden .................................. 9502046

[51] Int. Cl.[6] ............................. B01D 33/21; B01D 33/76
[52] U.S. Cl. ........................ 210/232; 210/239; 210/327;
210/331; 210/334; 210/402; 210/542; 210/784;
210/780
[58] Field of Search ..................................... 210/327, 331,
210/334, 542, 239, 402, 396, 784, 780

[56] References Cited

U.S. PATENT DOCUMENTS

| 1,141,213 | 6/1915 | Schutz . |
|---|---|---|
| 1,266,133 | 5/1918 | McCaskell . |
| 1,283,925 | 11/1918 | Salisbury . |
| 3,471,026 | 10/1969 | Riker . |
| 4,334,900 | 6/1982 | Neumann . |
| 4,943,372 | 7/1990 | Kohonen . |
| 4,961,864 | 10/1990 | Bruke . |

FOREIGN PATENT DOCUMENTS 290629   3/1916   Germany .

*Primary Examiner*—Thomas M. Lithgow
*Attorney, Agent, or Firm*—Browdy and Neimark

[57] ABSTRACT

A device for filtering a liquid substance comprising a container (1) having an inlet (2), a rotor (6), an inner rotor part (7), at least one disc filter (8). Spray nozzles are provided for releasing material filtered away from the substance and deposited on the filter disc. Furthermore there are conveyors (17) for removing the material released.

21 Claims, 2 Drawing Sheets

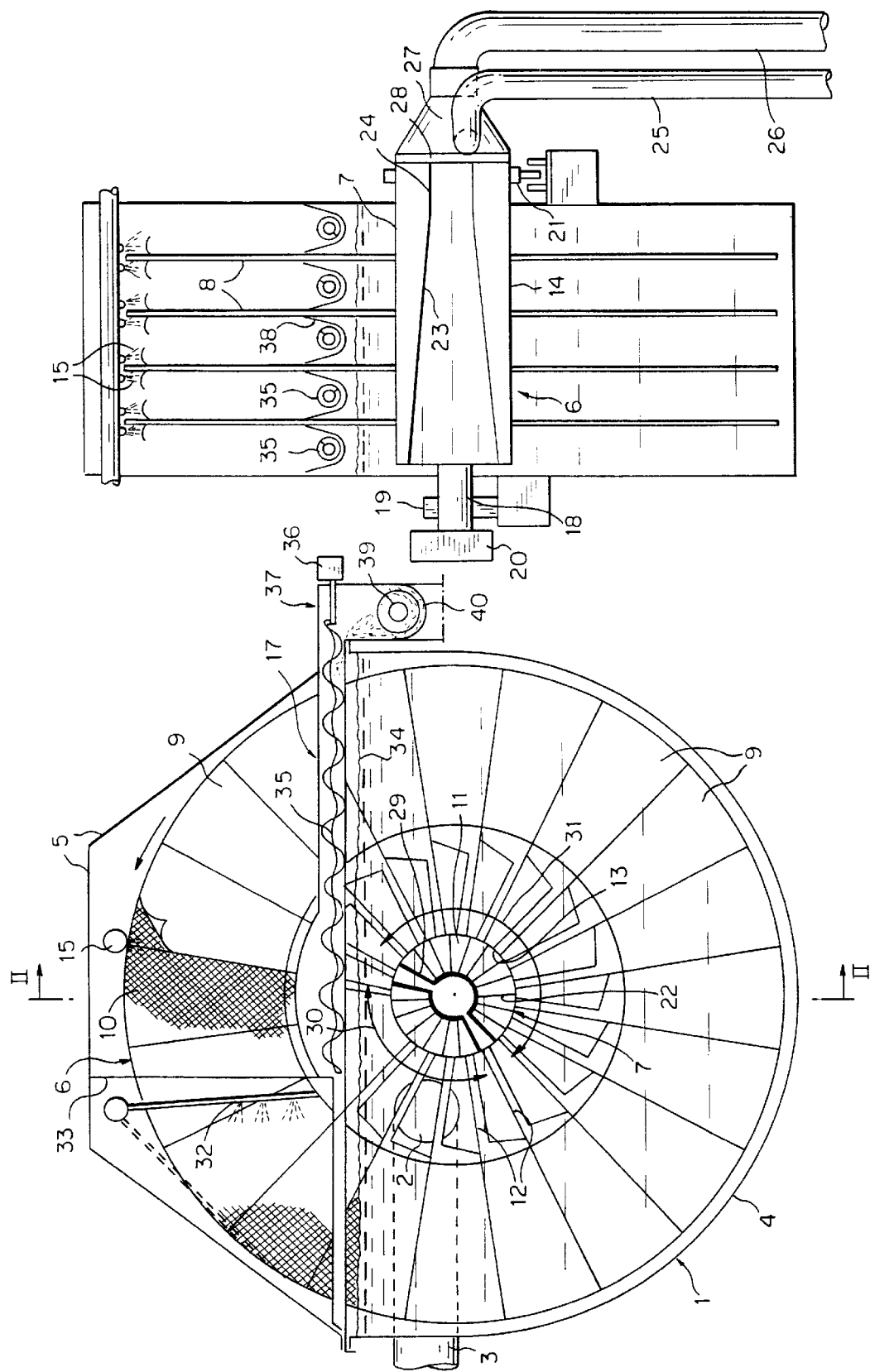

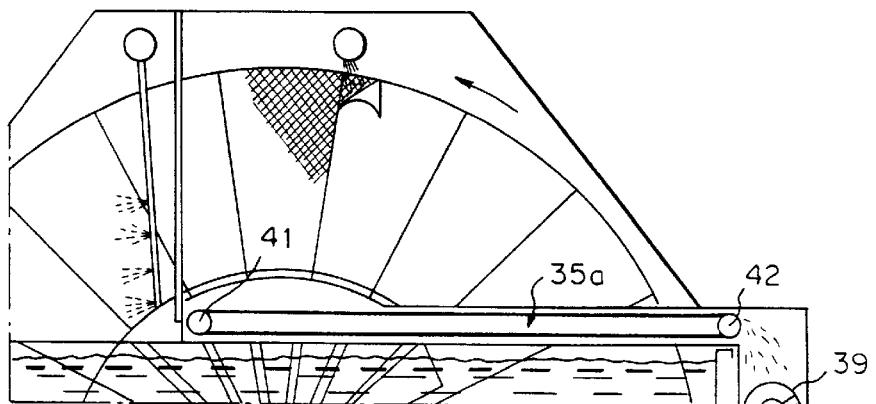
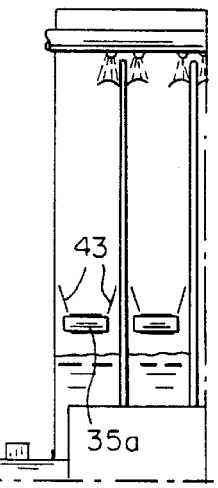
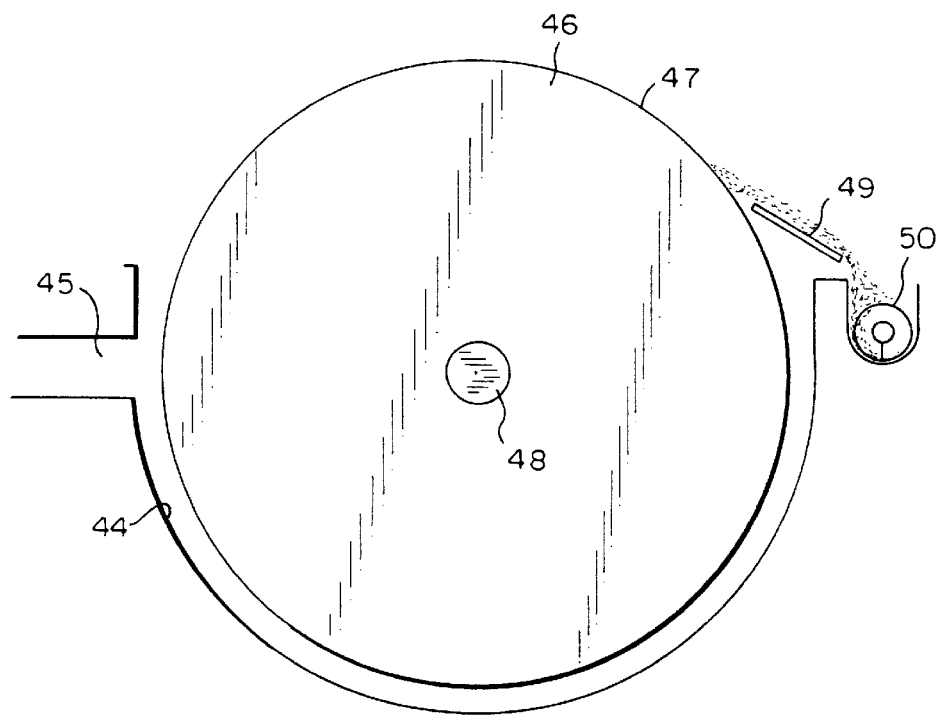

DEVICE FOR FILTRATION AND A METHOD FOR CONVERSION

FIELD OF THE INVENTION AND PRIOR ART

This invention is related to a device for filtering a liquid substance according to the pre-characterizing part of enclosed claim 1. Furthermore, the invention is related to a method for converting a drum filter into a disc filter according to the pre-characterizing part of enclosed claim 16.

The expression "liquid substance" occurring hereinafter is intended to comprise various liquids, suspensions et cetera containing constituents desired to be filtered away. Even if the invention in no way is restricted thereto, a preferred application of the invention is in connection with dewatering of fibre suspensions. As fibres, cellulose fibres are primarily in view. In disc filters of the nature in question there are two main types relevant in this connection, namely a first according to the pre-characterizing part of claim 1, in which the means for removal of the released material and being present between two adjacent filter discs has the character of a chute, an upper end of which is designed to receive the material released and which is arranged to deliver, at its lower end, this material to a receiver, which as a rule is formed by a conveyor, for instance a screw conveyor, extending with its longitudinal direction substantially parallel to the axis of the rotor. The conveyor is in practise located under the container. In the other main type, which does not correspond to the pre-characterizing part of claim 1, there is instead arranged, within the inner rotor part, a conveyor extending along the axis of rotation of the inner rotor part, said conveyor being arranged to intercept material released from the filter discs and remove the same at one end of the rotor and the container.

These known techniques involve several disadvantages. Without being in any way exhausting, some of these disadvantages will be pointed out: In the first main type of disc filter, a disadvantage is that the chutes occurring between the filter discs require a rather large space, which means that the filter discs must be located at a rather large axial distance from each other. Furthermore, it is a problem that the material which has been filtered away and released tends to adhere to the chute walls since they are stationary. This problem is of such a serious nature that it has been found to be necessary to arrange specific liquid spraying members to establish, along at least parts of the chute walls, a liquid flow tending to deliberate the chute walls from material filtered away and possibly deposited thereon. This liquid spraying involves, however, necessarily an increased liquid content in the material filtered away, this being as a rule a considerable disadvantage. The requirement for designing the upper portion of the chute so as to be able to intercept material filtered away and released means in practice that the substance level in the container must be set to be relatively low, which involves a relatively low capacity, in particular in connection with the need for a relatively large axial distance between the filter discs. Furthermore, the arrangement of the chutes between the filter discs means that a particular inlet box must be arranged along the longitudinal extent of the container. The purpose of this inlet box is to distribute the arriving substance to be filtered in a uniform manner along the filter discs of the rotor. The inlet box may, to achieve uniform distribution of the substance, comprise inlet sections opening between adjacent pairs of filter discs. Such inlet box structures increase considerably the cost for the device in its entirety.

The second main type of disc filter suffers from the disadvantage that it is a rather costly construction to arrange the longitudinal conveyor within the inner rotor part. Furthermore, this longitudinal conveyor tends to necessitate a relatively bulky design of the inner rotor part. In addition, the location of the conveyor in the inner rotor part complicates the formation of conduits for conveying the filtrate from the filter discs and makes the same more costly. This formation of conduits must, namely, be carried out in a ring shape externally of the conveyor. Material falling towards the conveyor may, furthermore, arrive on the conduits.

A further disadvantage common to the two main types described is that an interruption of operation or a breakdown as far as the conveyor is concerned puts the entire filtering device out of operation.

So called drum filters occur in large numbers. Drum filters are characterized by the configuration defined in the pre-characterizing part of claim 16. However, they suffer from the disadvantage that they have a rather low capacity. The capacity is considerably lower than for disc filters having a corresponding total machine size. It would be desirable to be able to convert such drum filters to disc filters with a reasonable cost investment. However, up to now such conversion would involve such high costs that it generally has been found to be preferable to replace the drum filter in its entirety with a disc filter.

SUMMARY OF THE INVENTION

The object of this invention is to develop the device according to the pre-characterizing part of claim 1 so as to achieve a filter device improved from the point of view of costs and/or capacity and/or safety of operation as a consequence of improvements as far as the means for removal of the released material which has been filtered away are concerned.

This object is according to the invention achieved by providing the device with the features appearing from the characterizing part in the enclosed claim 1.

Preferable developments of the invention are defined in the dependent claims 2–20.

The design according to the invention involves several advantages, the following of which deserve to be emphasised:

1. Better usage of the filter area installed; the possibility of a higher level of substance in the container gives a higher filtration capacity.

2. In comparison with prior embodiments having chutes between adjacent filter discs, the filter according to the invention may operate with higher incoming concentrations in the substance of the material to be filtered away. In case of cellulose fibres the concentration may be within the interval 2–3%, i.e. considerably higher than what is possible today.

3. The filter device according to the invention may be used for substances having a lower dewatering resistance than what is possible with prior disc filters having chutes between the filter discs. Such a lower dewatering resistance gives rise to thickening of the suspension in the container. In case of cellulose fibres, the filter device may manage dewatering resistance value of 450–700 CSF.

4. In comparison with the known disc filter having chutes between the filter discs, the filter device according to the invention gives a higher output concentration of the material, which has been filtered away, as a consequence of the fact that the drying time may be longer. In the known design, the chutes must be located on that side of the inner rotor part where the filter discs leave the bath of substance, which means that the means for releasing the material, which has been filtered away, from the filter discs must be located to exert their releasing operation in an area above the chutes.

5. Since no chutes are required any more between the filter discs and instead the transport members require a smaller space between these filter discs, the filter device in its entirety may be shorter, i.e. with a shorter container, inner rotor part et cetera.

6. No separate inlet box for the substance to be filtered is needed since the chutes have been eliminated. Instead the inlet of substance may be made at one gable of the container and the container proper may form an inlet box as a consequence of the fact that the substance to be filtered may pass unobstructedly along the container in absence of the chutes.

7. The advantages mentioned hereinabove give a lower production cost and a higher capacity as compared to a disc filter having chutes according to prior art as discussed hereinabove.

8. Individual transport members between filter discs may be stopped and may be dismounted for service and maintenance without having to stop the filter device in its entirety.

9. The solution according to the invention with moveable transport members forcibly providing transport of the material which has been filtered away eliminates the need for addition of further liquid for cleaning purposes, as in the case with the prior filter with the chutes between the filter discs and where water spraying must occur in order to keep the walls of the chute free from deposits.

Furthermore, the invention aims at providing possibilities for rational conversion of drum filters into disc filters according to that defined in the preamble of claim 16.

This object is according to the invention achieved by carrying out the conversion method in accordance with that defined in the characterising part of claim 16.

In that way conversion is achieved with a minimum of constructive interference in the basic drum filter construction, i.e. its container, substance inlet and the conveyor for conveying the material which has been filtered away. More specifically, the moveable transport members placed between the filter elements of the disc filter rotor will, accordingly, be able to transport away the material which has been filtered to the conveyor already present in the drum filter, such that the latter and the subsequent material handling members do not have to be reconstructed.

Further advantages and aspects of the solution according to the invention will be discussed in the following:

BRIEF DESCRIPTION OF THE DRAWINGS

With reference to the enclosed drawings a more specific description of an embodiment example of the invention will follow hereunder.

In the drawing:

FIG. 1 is a diagrammatical, partly cut end view of the filter device according to the invention;

FIG. 2 is a section view taken along the line II—II in FIG. 1;

FIG. 3 is a detail view corresponding to the upper portion in FIG. 1 but illustrating an alternative embodiment;

FIG. 4 is a view taken in accordance with the view in FIG. 2 but illustrating only an upper portion of the alternative embodiment illustrated in FIG. 3; and FIG. 5 is a diagrammatical view illustrating the basic construction of a drum filter known per se.

DETAILED DESCRIPTION OF PREFERRED EMBODIMENTS

The filter device according to the invention will hereinafter be described as applied for dewatering of cellulose fibre pulp.

The filter device comprises a container, which is generally denoted 1 and which has an inlet 2 for the fibre suspension. This inlet 2 is arranged in a gable wall of the container 1. A duct leading to the inlet 2 is denoted 3. The container 1 has a lower part 4 having the character of a bowl, the upper part of which is closed by means of one or more covers or the like 5, which may be opened.

A rotor generally denoted 6 is rotatably arranged in the container 1. This rotor comprises an inner rotor part 7 and a number of outer disc like filter elements 8 orientated transversely to an axis of the inner rotor part 7. This axis coincides with the axis of rotation of the rotor. Although it is preferred in practise that the disc-like filter elements 8 are orientated generally perpendicularly to the axis of rotation of the rotor and the axis of the inner rotor part 7, it is pointed out that the expression "transversely" just used comprises also a certain deviation from such a perpendicular position. The individual disc-like filter element 8 extends in an annular configuration about the inner rotor part 7. This annular configuration is more specifically divided (see FIG. 1) into a number of filter sectors 9. Each of these filter sectors 9 comprises an outer filtration covering, which in FIG. 1 is indicated by the screen pattern at the top, and inner conduits (not illustrated) for conveying filtrate passing through the filtration covering 10 to one or more filtrate conduits 11 in the inner rotor part 7.

As appears from FIG. 1, each individual filter sector 9 comprises a pipe-like conduit section 12 for transferring the filtrate, i.e. the filtrated water, from the filter sector 9 in question into a respective filtrate conduit 11 in the rotor part 7 via an opening 13 arranged for the filter sector in question in a mantle 14 of the rotor part 7.

The device comprises means 15 for releasing fibre material, which has been filtered away, and which has deposited on the filtrating covering 10. These releasing means 15 are here formed by spray nozzles arranged to separate, by means of suitable spraying of water or other liquid, the mat of material, which has been filtered away, from the filter sectors as these rotate by. As will be described more closely hereinafter, the device comprises means 17 for removal of the released fibre material.

It appears from FIG. 1 that the pipe-like conduit sections 12 form a spoke configuration between the filter sectors 9 and the inner rotor part 7, i.e. that there are open spaces between these individual spokes. These open spaces make it possible for the fibre suspension supplied within the container 1 to distribute itself uniformly along the length of the container 1 not withstanding the fact that the suspension is supplied, in the embodiment illustrated, at one of the gables of the container. Besides, the fibre suspension may of course distribute itself within the container 1 through the slots occurring radially outwardly of the peripheries of the filter element 8 and the inside of the container 1.

The inner rotor part 7 has in practise the character of a central shaft, which in a suitable manner is journalled to rotate. It is indicated in FIG. 2 that the centre shaft 7 at one of its ends may comprise a shaft pin 18 mounted in a suitable bearing and coupled to a driving motor 20. At the other end, the centre shaft 7 is supported in bearings 21 contacting the outside of the mantle 17 of the centre shaft 7.

The filtrate conduits 11 within the centre shaft 7 have the character of sector shaped spaces mutually separated by means of substantially radially orientated partition walls 22 extending along the entire length of the centre shaft 7. As appears from FIG. 2, the centre shaft 7 has a tubular core 23, against the mantle of which the partition walls 22 adjoin tightly such that the tubular core 23 forms radially internal delimitations of the filtrate conduits 11. As appears from FIG. 2 the tubular core 23 may have a varying diameter along the length of the centre shaft 7. More specifically, the device is such that the tubular core 23 has its smallest diameter at 24, which is that end of the tubular core 23 which is located at that end of the centre shaft 7 where the filtrate passes out of the centre shaft in its axial direction. It appears from FIG. 2 that two outlets 25, 26 are provided for filtrate. More specifically, the outlet 25 is intended for a pre-filtrate (cloudy filtrate) whereas the outlet 26 is intended for a clear filtrate. At least the clear filtrate outlet 26 and possibly also the pre-filtrate outlet 25 may have the character of fall tubes intended to establish a vacuum in a suction head, which is denoted 27 and which via a filtrate valve 28 communicates with the filtrate conduits 11 in the centre tube 7. The suction head 27 and the filtrate valve 28 are stationarily arranged and the latter includes a disc, which likewise is stationary and which comprises tight portions which are black in FIG. 1, and in addition, open portions which are sector shaped and which are indicated at 30 and 31 respectively. When the centre shaft 7 rotates in relation to the suction head 27 and the filtrate valve 28, those filter sectors 9, the conduit sections 12 of which are located in the opening sector 30 of the disc 29, will be brought into communication with a pre-filtrate outlet 25. Those filter sectors 9, the conduit sections 12 of which at the moment are located opposite to the opening sector 31 in the disc 29, are, on the contrary, brought into communication with the clear filtrate outlet 26 (the vacuum fall tube).

The device comprises further means 32 for cleaning the filter sectors after the same having been deliberated from deposited fibre material by means of the releasing means 15. The means 32 may have the character of spraying nozzles, for instance located on an oscillating carrier so as to efficiently sweep over the filter sectors. A partition 33 extending axially in relation to the rotor separates that upper area of the interior of the container, where the deposited fibre material is released from the filter sectors, from that area where spraying for cleaning purposes occurs by the means 32.

As the device has been described so far, it is constructed entirely in accordance with the prior art. It operates in the following manner known per se: When the rotor 6 rotates, the filter sectors 9 will, after having been cleaned by means 32, move downwardly into the suspension in the container 1. Water will then flow through the filter covering 10 on the filter sectors and fibres will then get stuck on the covering. The water flows within the filter sectors via the conduits 12 and the openings 13 into the filtrate conduits 11 and further, within the sector 30 of the disc 29, out through the pre-filtrate outlet 25. When the filter sectors then move further, they arrive gradually with their filtrate conduits 11 in the centre shaft 7 into the sector area 31 of the disc 29, which means that the filter sectors then are subjected to suction from the vacuum fall tube 26. This means effective suction of filtrate through the filter coverings and deposition thereon of fibre material. On continued rotation of the rotor, the filter sectors will then pass up over the suspension level, which is indicated at 34, in the container 1. This means that the suction via the vacuum fall tube 26 will create an air flow through the filter mat on the filter sectors and further through the conduit sections 12 in through the filtrate conduits 11. When the filter sectors 9 successively reach the releasing means 15, they are deliberated from the filter mats deposited thereon. The filter sectors 9 then pass to the cleaning means 32, whereupon the cycle is repeated.

The present invention deals primarily with improvements with respect to the removal means 17. These are, as is most clearly apparent from FIG. 2, located between each pair of adjacent filter discs 8 and also externally of the filter discs located outermost on the centre shaft 7.

In accordance with the invention each of the removal means 17 comprises a moveable transport member 35, which by means of a driving member 36 is driveable to displace the released fibre material substantially parallel to the plane of the filter discs 8 at an angle, preferably a substantially right angle, to the axis of rotation of the centre shaft 7. More specifically, the transport member 17, see FIG. 1, is arranged to displace the material, which has been filtered away, to a location 37 situated externally of the peripheries of the filter discs 8. As is indicated in FIG. 1, the location 37 is situated externally of the container 1.

The transport member 35 extends preferably substantially horizontally. Furthermore, it is preferred that the transport member 35 extends above the axis of the centre shaft 7. Expressed in other words, the transport member 35 is intended to have moveable transporting portions located on either sides of a vertical plane which is parallel to and coincides with the axis of the centre shaft 7 and also with the axis of rotation thereof.

The transport member 35 is in its entirety located above a horizontal plane, which forms a tangent to the uppermost portion of the centre shaft 7. In this connection it is preferred that the transport member 35 extends substantially parallel to and just above the level 34 of the suspension in the container 1.

The transport member 35 is located (see FIG. 2) in a channel 38 and arranged to displace the material, which has been filtered away, along this channel. As appears from FIG. 2, it is preferred that the channel 38 has side walls which rather closely adjoins to the adjacent filter discs 8 in an order to efficiently receive the material released from the filter sectors 9. It is preferable that each channel 38 at the bottom has a shape adapted to the shape of a transport member 35 and at the top has diverging side walls.

The transport member 35 are located such that they have portions situated in that area of the container where the filter discs move up and out of the substance to be filtrated. Thus, the release of material, which has been filtered away from the substance, from the filter discs occurs so that the material adhering to the filter discs first passes the transport members 35 and then is released and falls down on the transport members. Not until thereafter do the filter discs reach into a cleaning area, in which cleaning is conducted by means of cleaning members such as those denoted 32. In order to obtain as large an area as possible in which air is sucked through the filter discs and in which material released from the filter discs may be received by the transport members 35, the transport members extend above and beyond the inner rotor part 7.

An individual transport member 35 comprises a driving member 36 driving the transport member, said driving member being without driving connection with one or more further transport members 35. The meaning of this is that if an individual transport member 35 or the driving member 36 thereof is put out of operation due to need of service, maintenance or a breakdown, there should be at least one or some further transport members with unimpaired function, so that the filter device in its entirety may be operated further, although with a reduced capacity. In the optimum case, each individual transport member 35 is intended to have its own driving member so that in case of a breakdown or need of service of an individual transport member, all other transport members may continue to operate without appreciably lowering the total capacity of the filter device. In variants being more of a compromise, two or further transport members 35 may be driven commonly by one and the same driving member, so that a greater reduction of capacity of the filter device occurs when there is need of service and maintenance or when a breakdown occurs.

The transport members 35 are arranged to transport the material, which has been filtered away, to a conveyor 39, adapted to convey the material received substantially along the axis of rotation of the centre shaft 7. In other words the conveyor 39 receives the material, which has been filtered away, at location 37, preferably as a consequence of the transport members 35 delivering the material so that it may fall down into the conveyor 39.

In the example the transport member 35 is formed by a transport screw. This is preferably of the nature which does not have any core. This means that the transport screw comprises a longitudinal centre cavity, which on rotation of the transport screw allows, in case of material accumulations, the transported material to move over a thread portion of the transport screw. In this way occurrence of high counter pressures on interruptions in the feeding are avoided.

It is preferred that the transport member 35 is in absence of attachment in the area of its inner end inside of the container so that, accordingly, the transport screw conveniently may be retracted perpendicularly to the longitudinal extension of the rotor out of the bowl 38 when replacement or service is required.

It is preferred that also the conveyor 39 comprises a transport screw arranged in a trough 40, which opens at the top for receiving the material, which has been filtered away and which is discharged by the transport screw 35 at the extreme end of the channel 38.

The presence of the transport members 35 between the individual filter discs 8 ensures a very safe and efficient removal of the material, which has been filtered away, perpendicularly to the axis of rotation of the rotor. The actively moveable transport members 35 require a smaller axial space than the stationary chutes which have been used according to the prior art and provide, nevertheless, a more safe removal with a higher concentration of the material removed.

The variant according to FIGS. 3 and 4 corresponds to the embodiment according to FIGS. 1 and 2 with the exception that the transport member 35a here has the character of a transport belt of an endless type. This transport belt is laid around diverting members 41, 42 in the form of rolls, rollers or the like and operates such that material, which has been filtered away and which falls down on the upper part of the transport belt is delivered to the conveyor 39. As appears from FIG. 4, guide members 43 in the form of plates or the like are adapted to guide material falling downwardly onto the upper part of the transport belt 35a. The transport belt 35a is preferably driven in the manner that the diverting member 42 which is the outer one with regard to the axis of rotation of the rotor is driven by a suitable driving member. For the rest, the embodiment according to FIGS. 3 and 4 is intended to correspond to the one previously described.

A drum filter of a nature known per se is illustrated in FIG. 5, said drum filter comprising a container 44, an inlet 45 to the container for the suspension to be filtered, a drum 46, which is rotatable in the container and which has a peripheral filter mantle 47, means 48, for instance in the form of a centre shaft of the drum, for discharging filtrate which has entered the interior of the drum, means 49 for deliberating the filter mantle from material, which has been filtered away from the suspension and a conveyor 50 for receiving and removing the material, which has been filtered away, along the axis of rotation of the drum 46.

In the embodiment according to FIG. 5 the filter mantle 47 is intended to be relatively smooth or otherwise of such a nature that material deposited on the filter mantle may be removed by means 49 in the form of doctor blades or similar. In more advanced filter mantle designs, for instance having a pleated form for the purpose of improving capacity, other means 49 than doctor blades, for instance spray nozzles, may be used for deliberating the filter mantle from material which has been filtered away.

The present invention enables, by means of the basic structure described with assistance of FIGS. 1–4, that a drum filter of the nature illustrated in FIG. 5 comparatively cost effectively may be converted to a disc filter, which due to a considerably increased filter area, gives rise to a considerably increased capacity. In order to achieve such conversion, the rotatable drum 46 of the drum filter-according to FIG. 5 is removed and this drum is replaced by a disc filter rotor corresponding to the rotor 6 according to the embodiment described, said disc filter rotor comprising a plurality of disc like filter elements 8 arranged about an inner rotor part 7. Between each pair of adjacent filter elements 8, a moveable transport member 35 or 35a is arranged in analogy to that described hereinabove, said transport member being arranged to receive material, which has been filtered away and which has been deposited on the filter elements 8 and released therefrom by means of releasing means, such as those denoted 15 in FIGS. 1 and 3, included in the disc filter, said transport member being driveable by means of a driving member such as that denoted 36 in order to displace the material received substantially parallel to the filter elements 8. It is then to be observed that the various transport members 35 or 35a occurring are installed so that they are capable of delivering the material, which has been filtered away and which is transported by them, to the conveyor 50 already present at the drum filter according to FIG. 5. The conveyor 50 is in reality analogic to the one denoted 39 in FIG. 1.

The conversion described means that very important parts of the existing drum filter may be maintained, namely its container 44, the arrangement in connection with the suspension inlet 45 and also the discharge conveyor 50 for the fibre material to be transported away. Last, but not least, large parts of the filtrate discharging system for the drum filter proper may be maintained and connected to the newly installed disc filter rotor.

It is evident that the device described and the conversion method described may be modified in several ways within the scope of the knowledge of the average man skilled in the art without deviating from the basic inventive concept.

I claim:

1. A device for filtration of a liquid substance, comprising a container (1) having an inlet (2) for the substance, a rotor (6) arranged in the container (1) and having an inner rotor part (7) and at least one disc-like outer filter element (8), which comprises filter sectors (9) and which is orientated at an angle to an axis of the inner rotor part (7), said filter element comprising an outer filtrating covering (10) and internal conduits for conveying filtrate passing through the covering to one or more filtrate conduits (11) in the inner rotor part, means (15) for releasing material filtered away from the substance and deposited on the filtrating covering (10) and means (17) for removing the released material, said removal means being arranged beside the filter element (8) for removal of the material released from the filter element, said removal means (17) comprising at least one moveable transport member (35), which is driveable by means of a driving member (36) for displacement of the material released substantially parallel to the extent of the filter element (8) at an angle to the axis of the inner rotor part (7), wherein the transport member (35) is arranged such that the filter sectors (9), when they move up and out of the liquid substance in the container (1), first pass the transport member (35) before they reach the releasing means (15), which is located such that the material released thereby falls down on the transport member (35).

2. A device according to claim 1, wherein said transport member (35) is arranged to displace the material filtered away to a location (37) externally of the periphery of the filter element (8).

3. A device according to claim 1, wherein the rotor (6) comprises a plurality of mutually spaced, disc-like filter elements (8) and that a movable transport member (35) is arranged between a pair of adjacent filter elements.

4. A device according to claim 1, wherein the transport member (35) extends substantially horizontally.

5. A device for filtration of a liquid substance, comprising a container (1) having an inlet (2) for the substance, a rotor (6) arranged in the container (1) and having an inner rotor part (7) and at least one disc-like outer filter element (8), which comprises filter sectors (9) and which is orientated at an angle to an axis of the inner rotor part (7), said filter element comprising an outer filtrating covering (10) and internal conduits for conveying filtrate passing through the covering to one or more filtrate conduits (11) in the inner rotor part, means (15) for releasing material filtered away from the substance and deposited on the filtrating covering (10) and means (17) for removing the released material, said removal means being arranged beside the filter element (8) for removal of the material released from the filter element, said removal means (17) comprising at least one moveable transport member (35), which is drivable by means of a driving member (36) for displacement of the material released substantially parallel to the extent of the filter element (8) at an angle to the axis of the inner rotor part (7), wherein the transport member (35) extends above a centre axis of the inner rotor part (7) such that the transport member (35) has moveable transporting portions located on either sides of a vertical plane which is parallel to and coincides with the axis of the inner rotor part (7) and also with the axis of rotation thereof and that the transport member extends above and beyond the inner rotor part (7), the transport member (35) being arranged such that the filter sectors (9), when they move up and out of the liquid substance in the container (1), first pass the transport member (35) before they reach the releasing means (15), which is located such that the material released thereby falls down on the transport member (35).

6. A device according to claim 1, wherein the transport member (35) in its entirety is located above a horizontal plane extending tangentially with respect to an uppermost portion of the inner rotor part (7), and above a centre axis of the inner rotor part (7) such that the transport member (35) has moveable transporting portion located on either sides of a vertical plane which is parallel to and coincides with the axis of the inner rotor part (7) and also with the axis of rotation thereof and that the transport member extends above and beyond the inner rotor part (7).

7. A device according to claim 1, wherein the transport member (35) is placed in a channel (38) and arranged to displace the material along said channel.

8. A device according to claim 1, wherein an individual transport member (35) comprises a drive member (36) driving said transport member, said driving member being without driving connection to one or more further transport members (35).

9. A device according to claim 1, wherein the transport member (35) is arranged to transport the material to a conveyor (39) arranged to convey material received substantially along the axis of the rotor (6).

10. A device according to claim 1, wherein the transport member (35) is a transport screw.

11. A device according to claim 10, wherein the transport screw (35) is of a type without core.

12. A device according to claim 1, wherein the transport member is formed by a transport belt (35a).

13. A device according to claim 1, wherein an individual transport member (35) is capable of being put out of operation and dismounted for service and maintenance without having to stop the filtering operation of the device and without having to stop at least some other transport members of the device.

14. A device according to claim 1, wherein said releasing means (15) comprising spray nozzles arranged to separate, by means of suitable spraying of water or other liquid, material, which has been filtered away, from the filter sectors as these rotate by.

15. A device according to claim 1, comprising means it is adapted for filtration of a liquid substance in the form of a cellulose fibre suspension.

16. A method for converting a drum filter into a disc-filter, said drum filter being of the kind comprising a container (44), an inlet (45) to the container for a liquid substance to be filtered, a drum (46) rotatable in the container, said drum having a peripheral filter mantle (47), means (48) for discharging filtrate which has entered into the interior of the drum, means (49) for deliberating the filter mantle from material filtered away from the substance and a conveyor (50) for receiving the material filtered away from the substance and conveying the same away, wherein the rotatable drum (46) of the drum filter is removed and replaced by a disc filter rotor (6) comprising a plurality of disc-like filter elements (8) arranged about an inner rotor part (7), that between each pair adjacent filter elements (8) a moveable transport member (35) is arranged, said transport member being adapted to receive material which has been filtered away and deposited on the filter elements (8) and released therefrom by releasing means (15) included in the disc filter, said transport member being driveable by means of a driving member (36) for displacing material received substantially parallel to the filter elements (8), and that the various transport members (35) are installed so as to deliver material transported by them to the conveyor (50) already present in the drum filter.

17. A method according to claim 16, wherein the disc-filter is adapted for filtration of a liquid substance in the form of a cellulose fibre suspension.

18. A device according to claim 2, wherein the transport member (35) extends substantially horizontally.

19. A device according to claim 18, wherein the transport member (35) extends above a center axis of the inner rotor part (7).

20. A device according to claim 19, wherein the transport member (35) in its entirety is located above a horizontal plane extending tangentially with respect to an uppermost portion of the inner rotor part (7).

21. In a device for filtration of a cellulose fiber suspension, comprising a container (1) having an inlet (2) for the cellulose fiber suspension, a rotor (6) arranged in the container (1) and having an inner rotor part (7) and at least one disc-like filter element (8) which comprises filter sectors (9) and which is oriented at an angle to an axis of the inner rotor part (7), each said filter element having an internal conduit for conveying filtrate passing through said filter element to a filtrate conduit (11) in the inner rotor part, a cellulose fiber releaser (15) for releasing cellulose fiber deposited on said filter element (8) therefrom, and a conveyor (17) for removing the released cellulose fiber, said conveyor (17) being arranged beside the filter element (8) and comprising at least one moveable and driven transport member (35, 35a) for movement of the released cellulose fiber in a direction substantially parallel to said filter element (8) at an angle to the axis of the inner rotor part (7), said filter element (8) having a rotary path of movement when in use through a first zone in which cellulose fiber is deposited thereon while said filter element (8) is submerged in the cellulose fiber suspension, then upwardly out of the cellulose fiber suspension into a second zone approaching said cellulose fiber releaser (15), then past said cellulose fiber releaser (15) into a third zone before reentering said first zone, the improvement wherein said transport member (35, 35a) extends through said second zone along a path near an interface between said first zone and second zone to a discharge end of said transport member (35, 35a), whereby the filter sectors (9), when they move up and out from the first zone into the second zone, first pass the transport member (35, 35a) before they reach the cellulose fiber releaser (15).

* * * * *